United States Patent [19]

McMillan et al.

[11] Patent Number: 5,728,949

[45] Date of Patent: *Mar. 17, 1998

[54] FLUID FLOW RATE MEASURING CIRCUIT

[75] Inventors: Robert D. McMillan; Robert M. McMillan, both of Georgetown, Tex.

[73] Assignee: McMillan Company, Georgetown, Tex.

[*] Notice: The term of this patent shall not extend beyond the expiration date of Pat. No. 5,542,302.

[21] Appl. No.: 631,372

[22] Filed: Apr. 12, 1996

Related U.S. Application Data

[63] Continuation-in-part of Ser. No. 377,148, Jan. 24, 1995, Pat. No. 5,542,302.

[51] Int. Cl.[6] .................................................. H01B 1/00
[52] U.S. Cl. ........................................ 73/861.77; 72/86.87
[58] Field of Search ................................ 73/861, 861.87, 73/861.77, 861.78, 861.79

[56] References Cited

U.S. PATENT DOCUMENTS

| | | | |
|---|---|---|---|
| 3,729,996 | 5/1973 | Metz | 73/861.77 |
| 4,172,381 | 10/1979 | Aigner | 73/861.77 |
| 4,173,144 | 11/1979 | Pounder | 73/861.79 |
| 4,432,244 | 2/1984 | Kataoka et al. | 73/861.77 |
| 4,467,660 | 8/1984 | McMillan, Jr. | 73/861.87 |
| 4,969,365 | 11/1990 | Strigard et al. | 73/861.77 |
| 5,307,686 | 5/1994 | Noren | 73/861.87 |
| 5,542,302 | 8/1996 | McMillan et al. | 73/861.77 |

*Primary Examiner*—Elizabeth L. Dougherty
*Assistant Examiner*—Max H Noori
*Attorney, Agent, or Firm*—Pravel, Hewitt, Kimball & Krieger

[57] ABSTRACT

A turbine wheel flow measuring transducer is provided for measuring low flow rates of corrosive fluids, whether fluids or gases. The transducer has a turbine wheel rotating in a housing fluid chamber at a rate set by the corrosive fluid flowing through the housing. Infrared light passing through the fluid is sensed and converted by an optical flow measurement circuit. The amount of light which passes through a rotating turbine wheel indicates flow rate. A processing circuit forms output signals indicative of fluid flow rate.

12 Claims, 3 Drawing Sheets

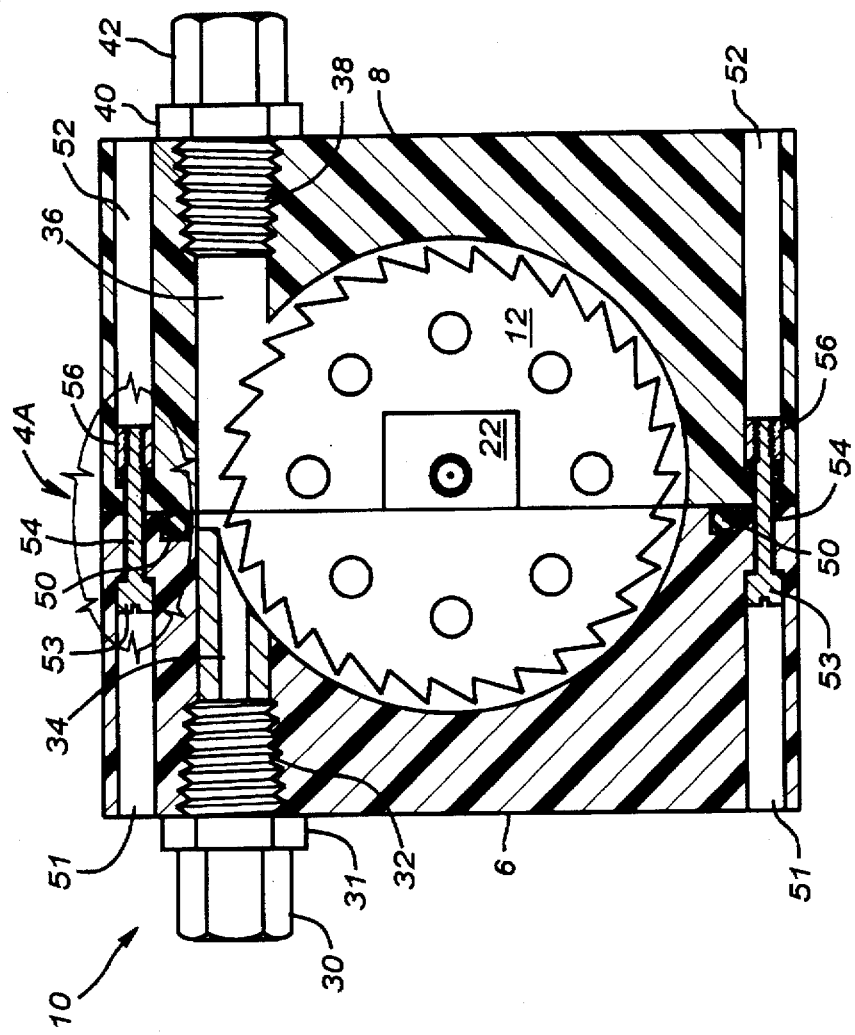
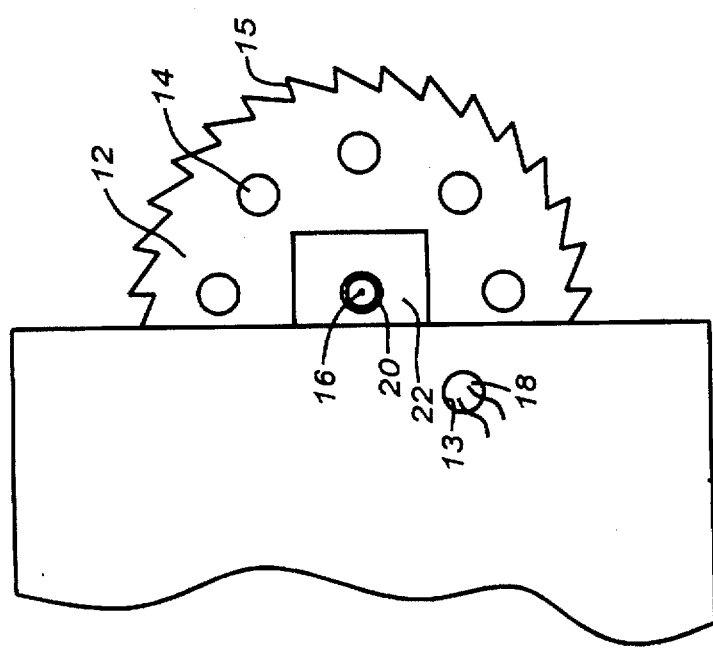
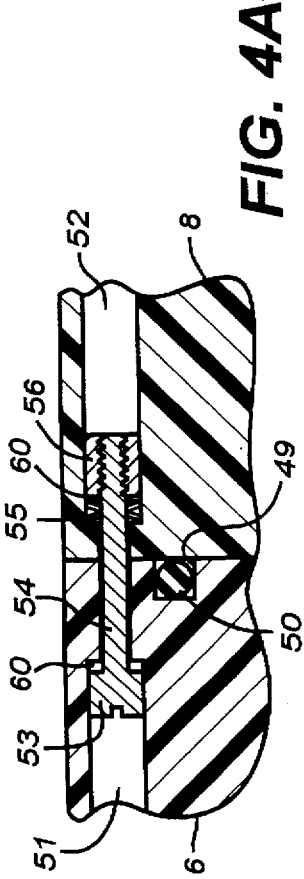
FIG. 4
FIG. 3
FIG. 4A

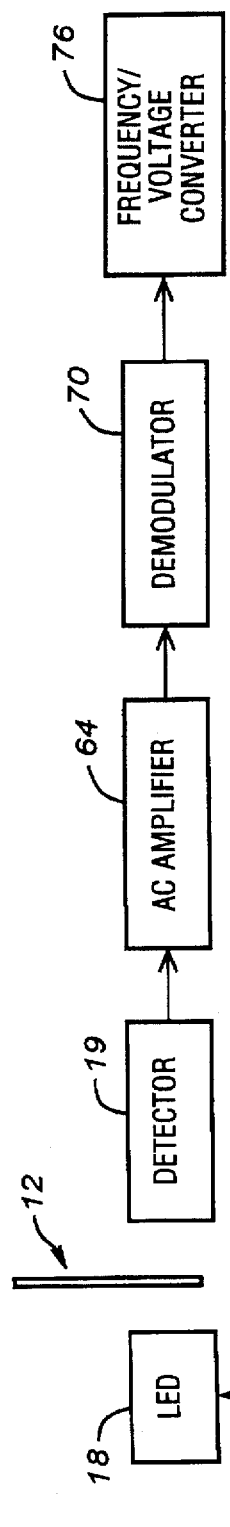
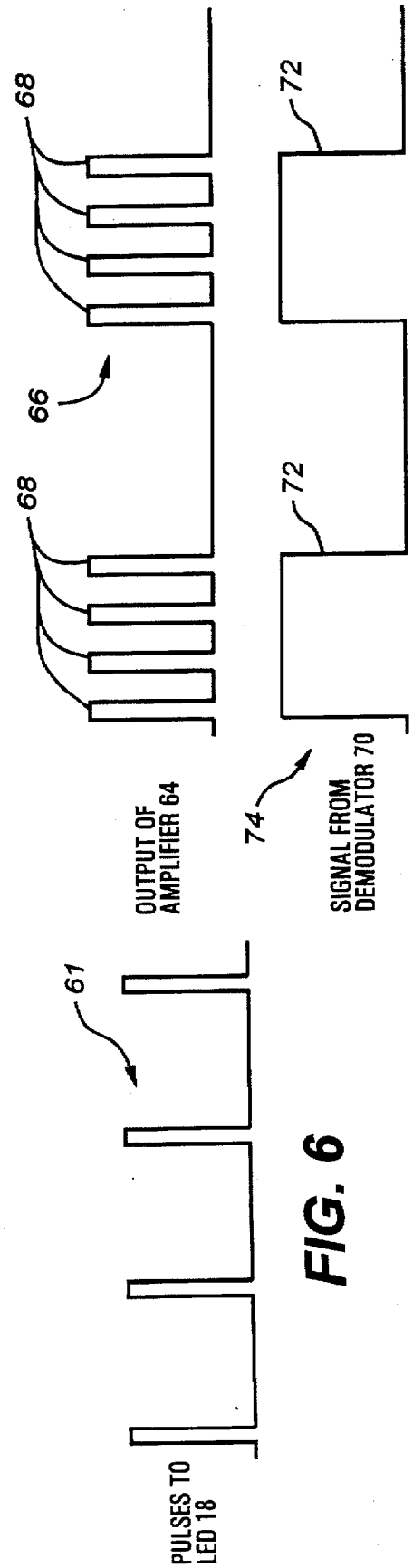
FIG. 5
FIG. 6
FIG. 7

FLUID FLOW RATE MEASURING CIRCUIT

CROSS-REFERENCE TO RELATED APPLICATIONS

The present application is a continuation-in-part of Applicants' commonly owned U.S. patent application Ser. No. 08/377,148, filed Jan. 24, 1995, now U.S. Pat. No. 5,543,302 issued Aug. 6, 1996.

BACKGROUND OF THE INVENTION

1. Field of the Invention

This invention relates to turbine wheel flow measuring transducers and, more specifically, to flow meters that measure low rates of flow of corrosive fluids, both liquids and gases.

2. Description of the Related Art

Conventional flow tube type liquid and gas flowmeters took the form of a vertically mounted glass tube containing a spherical or other shaped float that moved upward in the glass tube in proportion to the flow rate of the liquid or gas flowing through the glass tube. Such flow tube type flowmeters have historically been employed in various liquid and gas analyzers, liquid and gas metering devices and laboratory apparatus requiring flow measurement.

A great majority of instrument-related liquid and gas flow measurement applications call for very low flow rates to be measured. The majority of all such flow rate requirements was within the 100 to 1000 milliliter range with almost all falling within the 20 to 10,000 milliliter/minute flow range. Accordingly, a flow meter having the following characteristics would be highly desirable: inexpensive to construct; simple and reliable design; capable of measuring flow rates from 20 ml/minute to 10,000 ml/minute; having a very low pressure drop across the flow transducer; linear 0 to 5 v. D.C. electrical output directly proportional to the flow rates; and small in size, low in power consumption, with no "warm-up" time.

The axial flow turbine type flow transducer (Norton in HANDBOOK OF TRANSDUCERS FOR ELECTRONIC MEASURING SYSTEMS, first published in 1969) meets at least some of the requirements and was originally developed for aerospace flow measurements but has since become popular in numerous other fields. The typical turbine rotor resembles a propeller blade suspended inside a tube so that as a gas flow moves through the tube, the turbine rotor spins in proportion to flow rate. Bearing friction becomes a paramount problem whenever gas flows below 1000 ml/minute are to be measured. So, as sensitivity for this type of turbine gas flow meter increases, then the costs related to construction to overcome frictional problems accordingly also increased since rotor blade balancing problems were accomplished by tedious hand methods.

It is desirable to have a turbine-type flow measuring transducer that produces precisely linear pulses and direct current voltage outputs (0 to 5 volts D.C.) in response to flow rates. Further, the design of the flow sensor should be compact so that it may be employed inside various types of analytical instruments. The design should also be readily adaptable so that the flow sensor may be converted from measuring one flow range to measuring another, different flow range. Desirably, the design should allow the 5:1 linear range on gases and at least a 10:1 linear range on very low flow rate liquids, and up to about 50:1 range on higher flow rate liquids. Further, the power requirement should be for a single D.C. power supply at less than 200 miliwatts.

U.S. Pat. No. 4,467,660 provides a turbine wheel flow measuring transducer that meets many of these requirements. The apparatus of the '660 patent measures low flow rates of gas. A very thin, small diameter disk is rotatably mounted in a chamber within a housing through which the gas to be measured passes. Plural small reaction turbine blades or teeth are formed around the periphery of the disk for receiving substantially constant impact of the gas entering the chamber. A nozzle inlet means mounted in the housing directs the gas entering the chamber against the teeth on the disk, causing the rotation of the disk. A photoelectric circuit directs light onto side portions of the disk to measure the relative movement of the disk in response to the impact of the gas against the reaction turbine blades on the disk. The disk has reflective surfaces formed on the side portions for reflecting the light directed from the photoelectric circuit so that light reflected may be photoelectrically detected and an electrical measure of the gas flow rate formed.

The device of the '660 patent provides a reaction turbine wheel which is sufficiently sensitive to rotate with gas flow rates for air at low flow rates, such as, as low as 20 ml/minute, and possibly lower. Sensitivity for liquids is as low as 10 ml/min, and possibly lower. The impact torque imposed upon the turbine wheel by the gas or liquid must exceed the frictional counteractive torque caused by the weight of the turbine wheel assembly resting upon the shaft bearing supports, so that flow rates at this low level can be measured.

The apparatus of the '660 patent, is, however, not corrosion resistant. And, it is desirable to develop a corrosion resistant flow sensor capable of measuring very low flow rates of low viscosity liquids and gases that are very corrosive or that require the highest level of purity. Thus, the materials of construction of the device should prevent contamination of fluids being measured. Also, this device consumes approximately 320 miliwatts.

While there are numerous gas and liquid flow sensors capable of meeting some of the objectives enumerated above, none, to the inventors' knowledge, will meet all of the objectives outlined. For example, Brooks Instruments and Molytech both manufacture liquid flow sensors based upon a thermal detection principle. Most of these consume several watts of power. These sensors can measure very low liquid flow rates and are three to five times as expensive as turbine designs. Currently they are only available in designs with extremely low flow rate ranges (generally below 100 ml/min). Some other liquid thermal sensors use stainless steel which cannot handle many corrosive liquids. One European manufacturer makes a small turbine wheel sensor out of KYNAR® plastic. While this flow sensor has a lower flow rate measuring limit of about 100 ml/min. in liquids, it is unsuited for measuring low flow rate gas flows. Additionally, while KYNAR will withstand chemical attack from a variety of aggressive chemicals, it is subject to attack by many other chemicals. Also, this turbine wheel design of the sensor does not allow a turn down to measure very low liquid flow rates (of the order of 10 ml/min. or less). Finally, the design is not readily adaptable to having a large variety of flow ranges. Components must be remolded in order to measure different flow ranges. Another company, Miniflow Systems, Inc., makes a liquid flow sensor that has no shaft upon which a turbine wheel spins. This is called a "bearing less turbine wheel flow-sensor". The sensor works only in liquids and produces only a pulse output signal. The flow sensor has certain other major limitations, including use of materials unsuitable for corrosive liquids. (Ryton and epoxy for example). Also, molded parts have to be resized to accommodate various flow ranges, thereby making it economically unadaptable for measuring a wide variety of flow ranges.

Various other companies manufacture paddle wheel flow-sensors capable of measuring liquid flows of very aggressive chemicals. However, the sensors are quite large, will not respond to very low liquid flow rates, and are generally totally unsuited for the measurement of gaseous flows.

Certain gas flow sensors, commonly referred to as mass flow sensors, can measure very low gas flow rates with high precision. These sensors currently use stainless steel flow-through tubes that are heated so that they are limited as to the type of gas (compatible with stainless steel) they can measure. Further, they are not adaptable to blends of gases wherein the percentage of two or more gases that are blended together are allowed to vary. This is because the detection principle is based upon the specific heat of each gas and a calibration must be made for each particular type of gas to be measured. When a blend of gases is measured, wherein the ratio of the gases varies, the flow can then obviously not be measured with any great degree of accuracy since the detection principle and specific heat of the blend gas will vary with the composition of the gas flow. Further, thermal mass flow gas sensors will not measure liquid flows. Finally, these sensors typically utilize a wheatstone floating bridge design in the detection device so that they must be "warmed-up" and zeroed prior to use. This can introduce a fairly large time delay and zero error. Thus, these mass flow sensors are limited in their usage and generally require very pure, particle-free gases to prevent malfunction.

The devices of U.S. Pat. No. 4,467,660 comes the closest to meeting all the requirements for a flow measuring transducer, except that they are unable to handle aggressive gases and liquids due to the materials of construction used. Typically, commercial devices under this patent utilize RYTON® R-4 (a 40% glass-filled polyphenylene sulfide) which is a strong engineering plastic with very low thermal coefficient of expansion. This makes the measuring device thermally stable. However, this material and others used in that design are not immune to attack by chlorine gas, hydrochloric acid, and other aggressive chemicals.

There yet exists a need for a flow sensor that can be used to measure flow rates of chemically aggressive fluids and that presents inert surfaces to the measured fluid to prevent contamination of the fluid. Additionally, the flow measuring transducer should be low in energy consumption and have no "warm-up" time delay. Further, the flow sensor should readily be adaptable to measure flow rates in different ranges (from 20 to 10,000 ml/min (liquids and gases)) with the desired degree of accuracy.

SUMMARY OF THE INVENTION

The present invention includes an apparatus adaptable for measuring a range of flow rates of both liquids and gases. In particular, the apparatus is useful for measuring flow rates of fluids that are corrosive without contaminating these fluids with reaction products. The apparatus includes a thin, small diameter disk rotatably mounted in a chamber within a housing through which the fluid to be measured passes. A plurality of small reaction turbine blades or teeth are formed around the periphery of the disk for receiving substantially constant impact from fluids entering the chamber. A plurality of small holes are formed through the sides of the disk. Recesses are formed in the housing on either side of the disk, one for containing a light source, the other for a means for detecting light from the light source. When the apparatus is in use, the disk rotates and light from the light source passes through thin sections of the housing and through holes in the disk to the means for detecting light. Thus, the speed of rotation of the disk can be measured and consequently the flow rate of the fluid through the housing, over the disk.

The present invention provides an apparatus that is sufficiently sensitive so that the disk rotates with gas flow rates as low as 20 ml/minute and possibly lower. Further, the apparatus may be used to measure flow rates of liquids at as low as 10 ml/minute, and possibly lower.

The disk rotates around a sapphire shaft, the ends of the shaft cooperating with two sapphire bearings, each rotatably held in position on opposite sides of the disk against walls of the chamber in which the disk is mounted.

The disk, and inside surfaces or walls of the chamber, are fabricated from an organic polymeric composition that is resistant to corrosion and chemical attack by aggressive fluids. Preferably, the organic polymer is polytetrafluoroethylene (PTFE), commercially available as TEFLON® (a product of E.I. DuPont de Nemours).

The invention provides a flow sensor design that successfully overcomes the disadvantages of using PTFE for a flow sensing device. These disadvantages, which impact the accuracy of flow measurement, include the tendency of PTFE to cold flow or creep under the influence of pressure and/or temperature over time, and the relatively high thermal coefficient of expansion PTFE. Further, the invention compensates for the relatively low tensile strength of PTFE.

For small flow sensors, ambient fluorescent light may at times enter into the translucent PTFE and interfere with optical signal measurements. This can cause unwanted background measurements or noise which might otherwise interfere with output signal integrity and reduce measurement accuracy. The present invention provides an optical flow measurement circuit which has been found to overcome this problem.

BRIEF DESCRIPTION OF THE DRAWINGS

A better understanding of the present invention can be obtained when the following detailed description of the preferred embodiment is considered in conjunction with the following drawings, in which:

FIG. 3 is a partially exploded view of a flow measuring apparatus according to present invention showing part of the turbine wheel;

FIG. 4 is an elevation view in partial cross-section of an apparatus according the present invention showing the turbine wheel, bolts for holding the housing together, and flow tubes for the fluid to be measured;

FIG. 4A is an enlarged view of a circled portion of FIG. 4 having reference numeral 4A designating same and showing means for bolting together parts of the housing of an embodiment of the flow meter according to the present invention;

FIG. 5 is a schematic electrical circuit diagram of the apparatus of the present invention; and FIGS. 6 and 7 are diagrams of waveforms present in the circuit of FIG. 5.

DETAILED DESCRIPTION OF THE PREFERRED EMBODIMENTS

Figure 2:
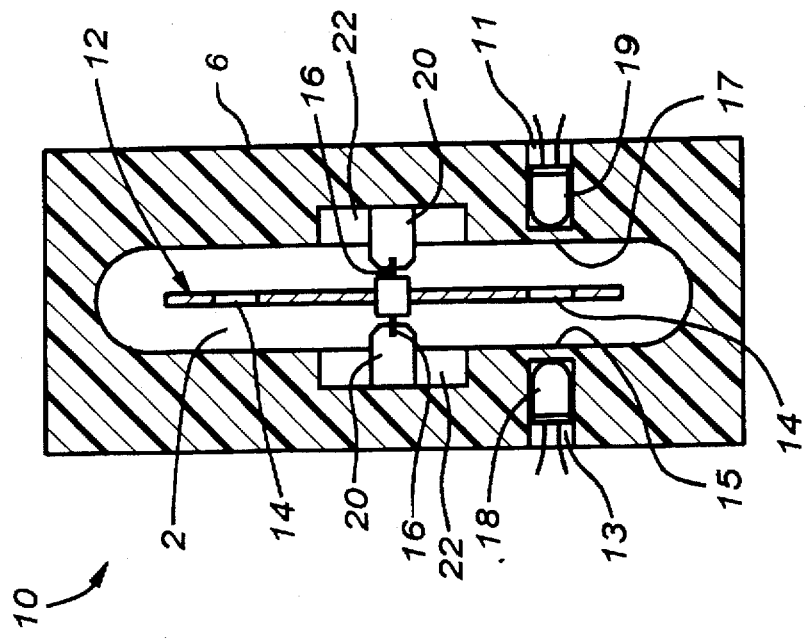
FIG. 2 is a cross-sectional view of a flow measuring transducer apparatus according to the present invention showing the housing, the bearings, and support means for rotatably positioning the turbine wheel within the housing.
Figure 1:
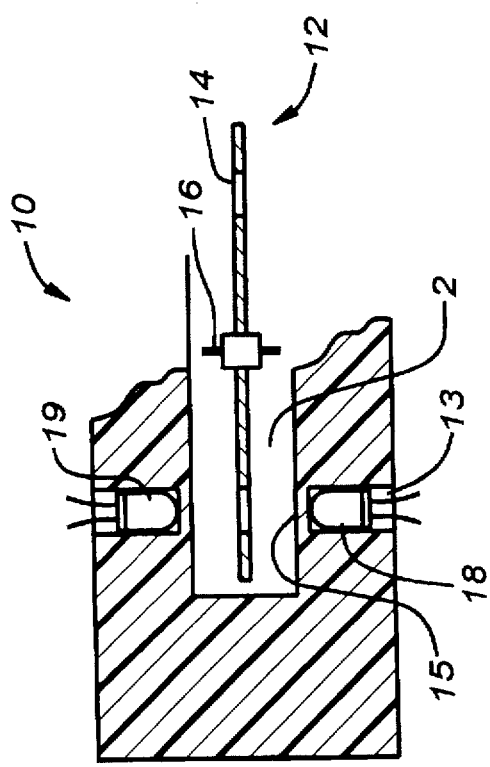
FIG. 1 is a cross-sectional view of a flow measuring transducer apparatus according to the present invention showing a portion of the housing and turbine wheel of the flow meter.

In its preferred embodiment, the turbine wheel flow measuring transducers of the invention may more readily be understood with reference to the attached drawings, FIGS. 1–4A. The flow measuring transducer or apparatus A has a housing 10 with a cavity 2 therein for receiving and mounting a turbine wheel 12. The turbine wheel 12 has surfaces 5 (FIG. 3) for impact with a fluid to rotatably drive the turbine wheel 12. Further, the turbine wheel 12 is equipped with a plurality of holes or bores 14 extending from one side of the wheel through to the other. The wheel 12 rotates around an axial bearing 16 that cooperates with means 20 for supporting the bearing so that the turbine wheel 12 is rotatably held in position within cavity 2. Housing 10 generally comprises two halves, 6 and 8 (FIG. 4). Housing half 6 has an elongate bore 13 (FIG. 2) partially drilled therethrough for receiving a source or means for transmitting radiation 18 through the bore blind end material 15 intervening between the end of bore 13 and cavity 2. Further, housing half 6 is equipped with an elongate bore 11 for receiving a sensor or means for detecting radiation 19, bore 11 terminating in bore blind end 17. Thus, bores 11 and 13 are aligned such that radiation emitted from radiation transmitter means 18 travels through bore blind end 15, a hole 14 in turbine blade 12, through bore blind end 17, to the radiation detector 19. However, when turbine wheel 12 rotates so that hole 14 is not aligned in the pathway between emitter 18 and receiver or detector 19, then no radiation signal is received by detector 19. Thus, the speed of rotation of the turbine wheel 12 can be determined by the frequency per unit of time in which a radiation signal emitted from 18 is received by detector 19.

As previously indicated, the invention provides a unique flow measuring apparatus that is capable of measuring the flow of corrosive fluids. Therefore, the preferred material of construction of the housing and turbine wheel is of corrosion resistant organic polymeric composition. Most preferably, this composition is an opaque polytetrafluoroethylene (PTFE). However, as explained before, the use of PTFE introduces several limitations into the design which affect the accuracy of flow measurements. These limitations include the tendency of PTFE to cold flow or creep under the influence of pressure and/or temperature over time and the relatively high thermal coefficient of expansion of PTFE. The invention compensates for these disadvantages and provides a highly accurate, adaptable flow measurement transducer for use with corrosive fluids.

Thus, according to a preferred embodiment of the invention, the housing 10, including housing halves 6 and 8, are machined from PTFE. The turbine wheel 12 is also fabricated from a PTFE composition, but one which has been rendered opaque to infrared light by darkening agents to provide optical contrast with the holes 14.

The turbine wheel 12 is also preferably supplied with a low friction shaft, such as a sapphire shaft 16. In order to allow measurement of very low flow rates, a very low friction bearing support 20 is required. This is provided by having the sapphire shaft 16 rotate within sapphire bearing supports 20. The bearing supports 20 are mounted in blocks 22 extending outwardly from the housing half 6.

While the housing 10 may expand and contract due to temperature variations of fluid being measured, a sufficient gap is allowed between the turbine wheel 12 and shaft 16 and bearing supports 20 to allow for dimensional changes caused by temperature variations. Thus, turbine wheel 12 is able to rotate freely at all times on sapphire shaft 16 held in place in bearing supports 20.

Since the housing is preferably fabricated from PTFE, the means for emitting radiation 18 and the detector 19 are preferably an infrared light emitting diode and a phototransistor receiver, respectively. Infrared light may be transmitted through PTFE for a short distance, therefore the thickness of blind bore ends 15 and 17 must be selected so that they are sufficiently thin to allow the passage of infrared light while not weakening the housing halves 6 and 8 so that the housing 10 is able to withstand the working pressure of corrosive fluids that flow through cavity 2.

Applicants have found that thicknesses in the range of about 0.025" to about 0.050" of conventional PTFE, which is considered opaque, meet these seemingly conflicting design considerations. Further, there is no need to use the very expensive, optical clarity PTFE considered necessary in the past for situations where passage of light through the material was required.

To measure the rate of flow of a fluid, a conduit bearing the fluid is releasably attached to tube fitting 30 (FIG. 4) cooperating with washer 31 for holding a replaceable inlet nozzle 32 in position within housing 10 so that fluid flowing through nozzle 32 impinges directly on blades 5 of turbine wheel 12. Replaceable nozzle 32 is preferably fabricated of PTFE. The impact of the fluid exiting nozzle 32 on surfaces 5 of turbine wheel 12, causes the wheel to rotate and this rate of rotation may be measured by detector 19. Fluid that has passed over the turbine blade 12 enters exit tube 36 held in place by fitting 40 to which is attached exit tube fitting 42 for receiving a conduit for leading the gas from the measuring instrument. Preferably, exit tube 36 is also of PTFE material.

The flow measurement device of the invention is readily adaptable for a wide range of flow rates by simply removing replaceable inlet nozzle 32 and replacing this nozzle with a nozzle of a different diameter (larger diameter for higher flow rates, smaller diameter for lower flow rates) so that the impact of the fluid on the surfaces 5 of turbine blade 12 may be maintained within a given range and the rotation of the turbine may be calibrated accordingly to determine the rate of flow of the fluid. Attention is directed to U.S. Pat. No. 4,467,060 of Applicant Robert D. McMillan, which is incorporated herein by reference, in this regard.

The light transmitter or source 18 and sensor or detector 19 are components of a flow measuring circuit C (FIG. 5) of the present invention. The radiation transmitter 18 is preferably a light emitting diode or LED emitting infrared light pulses of a wavelength of from about 0.9 to about 1.1 microns, or about 940 nm, at a suitable frequency or rate (typically about 1.5 KHZ) and a duty cycle of approximately ten percent (10%) as exemplified by a waveform 61 (FIG. 6) under control of a pulsed power source 62 (FIG. 5). The low power duty cycle of the source 18 allows for higher peak power levels of light to be transmitted. It also allows better signal output strength and higher reliability of the LED source 18.

The low duty cycle of source 18 is permitted by the transmission of infrared light through the housing 10 due to its characteristic of translucence to infrared light at the wavelength in which source is operating. This affords a material reduction in power consumption in the apparatus A over presently available miniature turbine flow sensors. It also keeps the source 18 from overheating and failing after relatively short intervals of service.

As has been set forth, the infrared light pulses from source 18 pass through the bore ends 15 and 17 of housing 2 as well the holes 14 in the rotating turbine wheel 12. The speed of rotation of the wheel 12 and thus fluid flow rate is detected by the frequency of appearance of holes 14 in rotating wheel 12 and the passage of light through the holes 14.

The detector 19 senses light passing through the wheel 12 and forms an electrical signal indicative of the light level sensed, which is furnished to an AC amplifier 64. The amplifier 64 forms an output signal in the form of groups of pulses 66 shown in a waveform 68 (FIG. 7) when a hole 14 is present between source 18 and detector 19.

Waveform 68 from amplifier 64 is furnished to a demodulator 70 which forms square wave pulses 72 (FIG. 7) in a demodulated output waveform 74. The demodulator 70 preferably includes a bandpass or low pass filter section. The filtering improves the signal-to-noise performance of the circuit C. The filtering also rejects signals at the frequencies (typically from 50 to 120 Hz, or so) at which electric lighting systems operate. This allows the flow measuring circuit C to process low amplitude light signals which pass through dark fluids or housing of higher optical density, with higher signal-to-noise performance. Output waveform 74 from demodulator 70 is provided to a frequency/voltage converter 76 (FIG. 5), which forms a direct current voltage level output signal of from 0 to 5.0 volts DC, depending on the frequency of appearance of square wave pulses 72 in output waveform 74. The output signal from frequency/voltage converter 76, when calibrated, is indicative of the flow rate of corrosive fluid through the apparatus A.

PTFE has a tendency to cold-flow under tension. Thus, the design according to the invention has machine screws 56, holding housing halves 6 and 8 together, that expand or contract due to temperature changes to prevent damage to the housing halves. More specifically, in a preferred embodiment, the invention provides preloaded machine screws 53 using Belleville washers 55. Thus, housing half 6 is equipped with a bore 51 for receiving a head 53 of a machine screw or bolt 54 cooperating with a Belleville washer 55. The bolt 54 extends through housing half 8 into a matching axially aligned bore 52 in housing half 8. Nut 56 is threaded onto the distal tip of bolt 54 to pretension the Belleville washer 55 and thereby hold housing halves 6 and 8 together.

As shown in FIG. 4A, flat washers 60 may be interposed between head 53 of machine screw or bolt 54 and housing half 6; and between housing half 8 and the Belleville washer 55; and between the Belleville washer 55 and threaded nut 56.

In order to ensure a tight seal between the housing halves 6 and 8, a groove 49 is provided in one of the housing halves, for example, housing half 6, for containing an O-ring or gasket of a TFE elastomer (Kalrez) seal 50. Thus, when the machine bolts and Belleville washers are tightened, the O-ring and/or gasket provides a positive seal between the housing halves 6 and 8.

Although the invention has been described with reference to its preferred embodiments, those of ordinary skill in the art may, upon reading this disclosure, appreciate changes and modifications which may be made and which do not depart from the scope and spirit of the invention as described above and claimed below.

We claim:

1. An optical flow measurement circuit for forming an electrical signal indicative of fluid flow, comprising:

a light source mounted for emitting light to pass through the fluid;

a light detector in optical alignment with said light source to sense the amount of light passing through the fluid; and a pulsed power source for energizing said light source at a duty cycle of about ten percent to thereby reduce power consumption.

2. The measurement circuit of claim 1, wherein the fluids are corrosive fluids at low flow rates and pressure drops.

3. The measurement circuit of claim 2, wherein said flow rates of the corrosive fluids are on the order of twenty milliliters per minute to ten thousand milliliters per minute.

4. The measurement circuit of claim 2, wherein said pressure drops of the corrosive fluids are on the order of about twenty inches of water pressure or less for corrosive gases.

5. The measurement circuit of claim 1, wherein:

said light source emits infrared light at a wavelength of about 0.9 to 1.1 microns.

6. The measurement circuit of claim 1, further including:

a processing circuit for forming an output signal indicative of fluid flow rate.

7. The measurement circuit of claim 6, wherein said processing circuit includes:

an amplifier forming a group of pulses in response to flow of fluid.

8. The measurement circuit of claim 6, wherein said processing circuit includes:

a demodulator forming square wave pulses in response to flow of fluid.

9. The measurement circuit of claim 6, wherein:

said demodulator includes a filter excluding signals at the operating frequency of electric light.

10. The measurement circuit of claim 6, wherein said processing circuit includes:

a frequency/voltage converter forming an output signal having a voltage level indicative of fluid flow rate.

11. The measurement circuit of claim 6, wherein said processing circuit includes:

an amplifier forming a group of pulses in response to flow of fluid;

a demodulator forming square ware pulses in response to pulses from said amplifier;

a frequency/voltage converter forming an output signal from the pulses from said demodulator having a voltage level indicative of fluid flow rate.

12. The measurement circuit of claim 11, said demodulator includes a filter excluding signals at the operating frequency of electric light.

\* \* \* \* \*